United States Patent
Shi

(10) Patent No.: US 10,558,023 B2
(45) Date of Patent: Feb. 11, 2020

(54) OPTICAL SYSTEM AND HEAD-MOUNTED DISPLAY APPARATUS USING SAME

(71) Applicant: SHENZHEN ROYOLE TECHNOLOGIES CO., LTD., Shenzhen, Guangdong (CN)

(72) Inventor: Hongyan Shi, Guangdong (CN)

(73) Assignee: SHENZHEN ROYOLE TECHNOLOGIES CO., LTD., Shenzhen, Guangdong (CN)

( * ) Notice: Subject to any disclaimer, the term of this patent is extended or adjusted under 35 U.S.C. 154(b) by 38 days.

(21) Appl. No.: 16/063,490

(22) PCT Filed: Sep. 14, 2016

(86) PCT No.: PCT/CN2016/099099
§ 371 (c)(1),
(2) Date: Jun. 18, 2018

(87) PCT Pub. No.: WO2018/049616
PCT Pub. Date: Mar. 22, 2018

(65) Prior Publication Data
US 2019/0072747 A1 Mar. 7, 2019

(51) Int. Cl.
*G02B 3/02* (2006.01)
*G02B 13/18* (2006.01)
(Continued)

(52) U.S. Cl.
CPC ............ *G02B 13/18* (2013.01); *G02B 13/00* (2013.01); *G02B 13/0045* (2013.01);
(Continued)

(58) Field of Classification Search
CPC ..................................................... G02B 13/18
(Continued)

(56) References Cited

U.S. PATENT DOCUMENTS 8,437,472 B2   9/2013   Tsai et al.
8,917,458 B2   12/2014  Tsai et al.
(Continued)

FOREIGN PATENT DOCUMENTS

CN   202502288 U   10/2012
CN   102914853 A    2/2013
(Continued)

OTHER PUBLICATIONS

International Search Report dated May 24, 2017 for corresponding International Application No. PCT/CN2016/099099, filed Sep. 14, 2016.
(Continued)

*Primary Examiner* — James C. Jones
(74) *Attorney, Agent, or Firm* — IPro, PLLC

(57) ABSTRACT

An ultra wide-angle high-resolution optical system includes, from a human-eye observation side to a side at an image display unit, a first, second, third, fourth, and fifth lenses sequentially and coaxially arranged in the direction of an optical axis. A relationship of the focal lengths of the first, second, third, fourth, and fifth lenses meet a certain criterion. In addition, the first lens, third lens, and fourth lens are positive lenses, and the second lens and fifth lens are negative lenses. At the same time, the relationship of refractive indexes of the first lens, second lens, third lens, fourth lens, and fifth lens at the line d and the Abbe numbers thereof meet a certain criterion. In this way, an image displayed on the display unit is magnified by the optical system and then imaged on the human-eye. Also disclosed is a head-mounted display apparatus including the optical system.

19 Claims, 6 Drawing Sheets

(51) Int. Cl.
*G02B 13/00* (2006.01)
*G02B 27/01* (2006.01)
*G02B 13/06* (2006.01)

(52) U.S. Cl.
CPC ......... *G02B 13/06* (2013.01); *G02B 27/0101* (2013.01); *G02B 27/0172* (2013.01); *G02B 2027/011* (2013.01); *G02B 2027/0123* (2013.01); *G02B 2027/0125* (2013.01)

(58) Field of Classification Search
USPC ........................................................ 359/714
See application file for complete search history.

(56) References Cited

U.S. PATENT DOCUMENTS

| | | | |
|---|---|---|---|
| 9,057,868 B1 | 6/2015 | Chung et al. | |
| 9,291,801 B2 | 3/2016 | Kubota et al. | |
| 2013/0242411 A1 | 9/2013 | An et al. | |
| 2013/0301147 A1 | 11/2013 | Yamada | |
| 2017/0235107 A1* | 8/2017 | Lai | G02B 13/0045 359/714 |

FOREIGN PATENT DOCUMENTS

| | | |
|---|---|---|
| CN | 203324564 U | 12/2013 |
| CN | 104570286 A | 4/2015 |
| CN | 104914558 A | 9/2015 |
| TW | 1493221 B | 7/2015 |
| TW | 201534960 A | 9/2015 |

OTHER PUBLICATIONS

Written Opinion of the International Searching Authority dated May 24, 2017 for corresponding International Applicatio No. PCT/CN2016/099099, filed Sep. 14, 2016.

English translation of the International Search Report and Written Opinion dated May 24, 2017 for corresponding International Application No. PCT/CN2016/099099, filed Sep. 14, 2016.

* cited by examiner

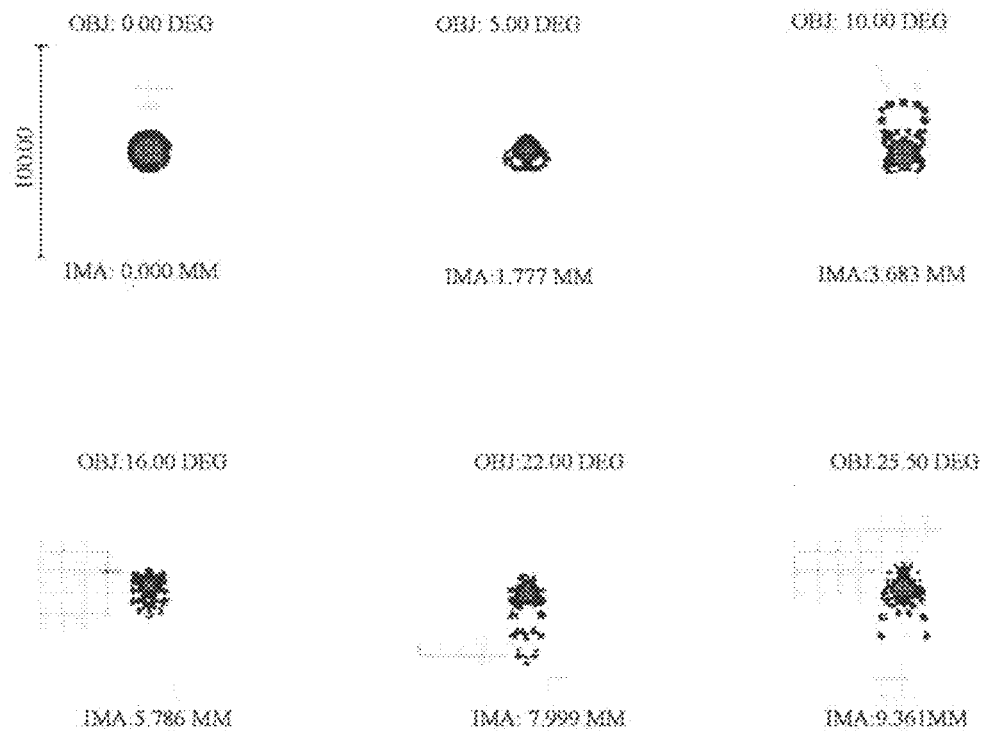
Figure 7
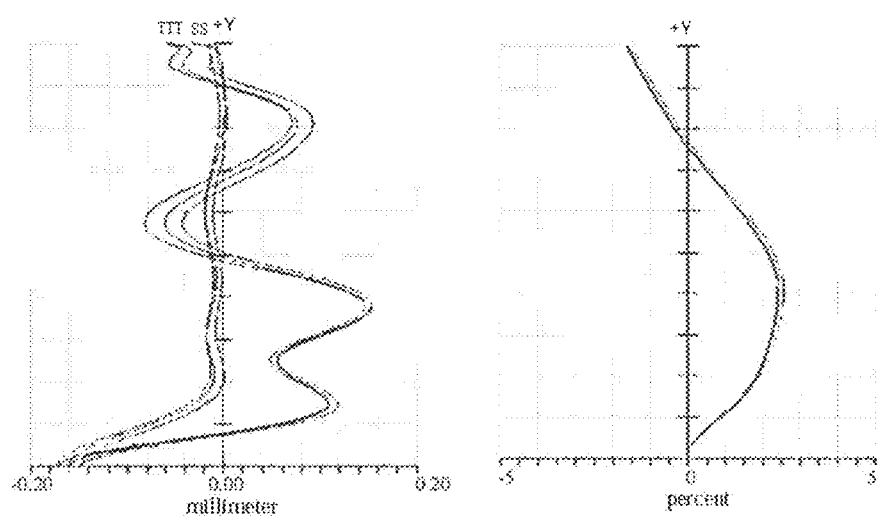
Figure 8(a)
Figure 8(b)

OPTICAL SYSTEM AND HEAD-MOUNTED DISPLAY APPARATUS USING SAME

CROSS-REFERENCE TO RELATED APPLICATIONS

This application is a U.S. National Phase application based upon PCT Application No. PCT/CN2016/099099, filed with the State Intellectual Property Office of P. R. China on Sep. 14, 2016, and published as WO 2018/049616 on Mar. 22, 2018, not in English, the entire content of which is incorporated herein by reference.

FIELD

The present disclosure relates to the field of optical technology, more particular to an optical system and a head-mounted display apparatus using the same.

BACKGROUND

With the development of technology, it has been booming up for research and development of a head-mounted display apparatus (Head Mount Display, HMD), which provides users full immersion of a virtual scenario without outside interference by enlarging an image from a display screen and presenting such an enlarged virtual image in front of human-eyes at a certain distance via a set of optical system. As an important component, the optical system is required to not only guarantee high resolution of image quality but also provide wider field-of-view due to characteristics such as a compact structure and lightweight, which make the head-mounted display apparatus to be portability.

SUMMARY

The object of the present disclosure is to provide an optical system suitable for a head-mounted display apparatus, with wide field-of-view and high resolution.

To achieve the above object, the present disclosure provides in embodiments an optical system, including a first lens, a second lens, a third lens, a fourth lens and a fifth lens in order arranged coaxially along an optical axis direction from a human-eye observation side to an image side at a display unit, wherein the first lens is a positive lens with a focal distance f1,
the second lens is a negative lens with a focal distance f2,
the third lens is a positive lens with a focal distance f3,
the fourth lens is a positive lens with a focal distance f4,
the fifth lens is a negative lens with a focal distance f5, and
the optical system is of a total focal distance ft, with the following formulas met:

$1.5 < f1/ft < 3$, $-2 < f2/ft < -1.2$, $2 < f3/ft < 2.5$, $0.5 < f4/ft < 1.5$, and $-6 < f5/ft < -1$.

Moreover, to achieve the object above, the present disclosure provides in embodiments a head-mounted display apparatus, including a display unit and an optical system as defined in any embodiment described above, wherein the optical system is disposed between human eyes and the display unit.

DESCRIPTION OF DRAWINGS

The following drawings are intended to illustrate embodiments of the present disclosure in detail in combination with specific embodiments. It should be understood that the elements existing in the drawings do not represent actual size and proportional relation, and are merely schematic diagrams illustrated for clarity, and should not be construed as a limit of the present disclosure.

FIG. 7 is spot diagrams of an optical system according to a second embodiment of the present disclosure.

FIG. 8(a) is field curve graphs of an optical system according to a second embodiment of the present disclosure.

FIG. 8(b) is a distortion curve graph of an optical system according to a second embodiment of the present disclosure.

DETAILED DESCRIPTION

In order to make the objects, technical solutions and advantages of the present disclosure clearer, the present disclosure will be further described in detail below in combination with a plurality of embodiments and the accompanying drawings. It should be understood that the specific embodiments described herein are only used to explain the present disclosure rather than construed to limit the present disclosure.

Figure 1:
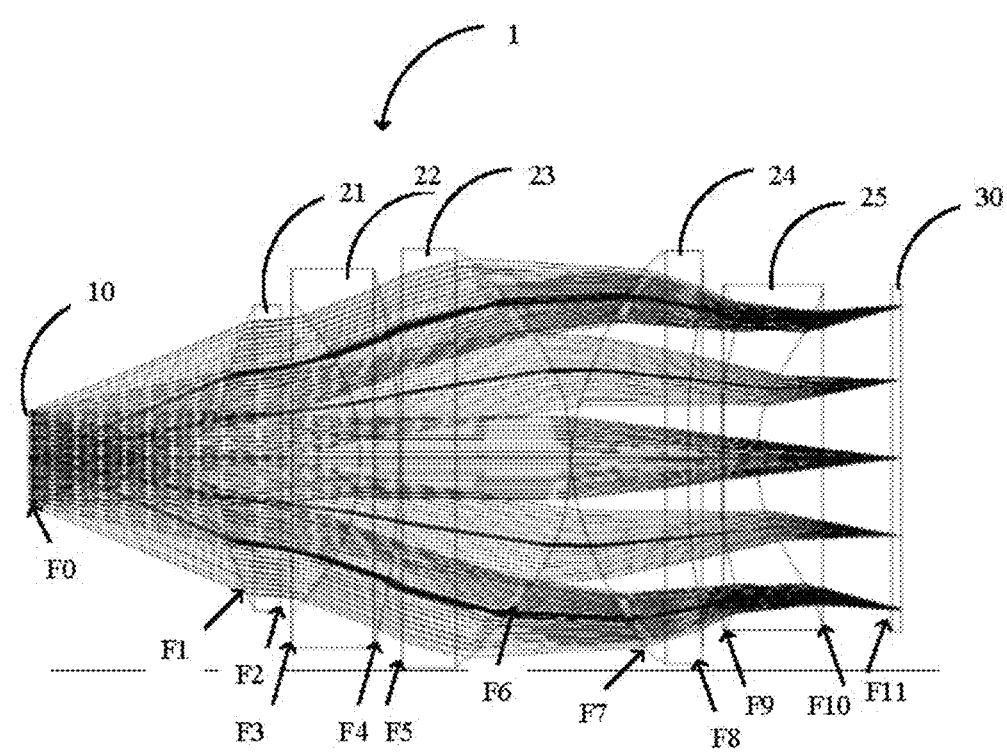
FIG. 1 is an optical path diagram of an optical system according to a first embodiment of the present disclosure.

With reference to FIG. 1, a schematic view is illustrated for an optical system 1 according to a first embodiment of the present disclosure, which can be mounted at a head-mounted display apparatus (not shown in the diagram) together with a display unit 30. The optical system 1 includes a diaphragm 10, a first lens 21, a second lens 22, a third lens 23, a fourth lens 24, and a fifth lens 25 arranged in order from a human-eye observation side to an image side at the display unit 30 (i.e., from left to right). In this embodiment, diaphragm 10 is an exit pupil for an image formed in the optical system and is a virtual light-exiting aperture. When human eyes are at the diaphragm 10, optimal images will be observed. In this embodiment, the first lens 21, the third lens 23 and the fourth lens 24 each are a positive lens, and the second lens 22 and the fifth lens 25 each are a negative lens.

From the left to right as shown in FIG. 1, a surface of the diaphragm 10 is numbered as F0, and similar numbering is given to individual surfaces of five lenses until a surface of the display unit 30 is numbered as F11. Specifically, the first lens 21 has a surface F1 facing and bulging toward the diaphragm 10, with a positive curvature radius for the surface F1. The second lens 22 has a surface F3 facing toward the first lens 21 and concaving toward the third lens 23 and a surface F4 facing and bulging toward the third lens 23. Curvature radiuses of the surface F3 and the surface F4 of the second lens 22 are negative. The third lens 23 has a surface F6 facing and bulging toward the fourth lens 24, with a negative curvature radius for the surface F6. The fourth lens 24 has a surface F7 facing and bulging toward the third lens 23 and a surface F8 facing toward the fifth lens 25 and concaving toward the third lens 23. Curvature radius of the surface F7 is positive, while curvature radius of the surface F8 is negative. The fifth lens 25 has a surface F10 facing toward the display unit 30 and concaving toward the fourth lens 24 and a surface F9 facing toward the fourth lens 24 (where the surface F9 has two distal portions concaving toward the display unit 30 at periphery away from an optical axis). Curvature radiuses of the surface F9 and the surface F10 are positive.

The first lens 21 and the second lens 22 each are spherical, while the fourth lens 24 and the fifth lens 25 each are aspheric. The surface F5 of the third lens 23 close to the second lens 22 is spherical; and surface F6 of the third lens 23 close to the fourth lens 24 is aspheric. Thus, the optical system can reduce aberration more sufficiently.

In this embodiment, a focal distance of the first lens is f1, a focal distance of the second lens is f2, a focal distance of the third lens is f3, a focal distance of the fourth lens is f4, a focal distance of the fifth lens is f5, and a total focal distance of the optical system is ft, with the following formulas met:

$1.5 < f1/ft < 3$, $-2 < f2/ft < -1.2$, $2 < f3/ft < 2.5$, $0.5 < f4/ft < 1.5$, and $-6 < f5/ft < -1$.

Specifically, referring to Table 1, it shows data associated with the optical system in the first embodiment of the present disclosure.

TABLE 1

Embodiment 1: exiting-hole diameter 7 mm, effective focal length 19, field-of-view 2ω = 51°, distance of exit pupil 13~15 mm

| Surf | surf type | Radius(mm) | Thickness(mm) | Material nd | vd |
|---|---|---|---|---|---|
| F0 |  | infinite | 13~15 |  |  |
| F1 | spheric | 24 | 4.3 | 1.53 | 56 |
| F2 | spheric | infinite | 5.4 |  |  |
| F3 | spheric | −15 | 2.7 | 1.64 | 24 |
| F4 | spheric | −51 | 0.2 |  |  |
| F5 | spheric | infinite | 12 | 1.53 | 56 |
| F6 | aspheric | −23 | 0.1 |  |  |
| F7 | aspheric | 13 | 8 | 1.53 | 56 |
| F8 | aspheric | −350 | 2.2 |  |  |
| F9 | aspheric | 22 | 2.5 | 1.64 | 24 |
| F10 | aspheric | 16 | 9.2 |  |  |
| F11 |  | infinite |  |  |  |

Referring to Table 2, it shows data associated with the aspheric surfaces of the lenses in the first embodiment of the present disclosure.

TABLE 2

| Surface | K | A2 | A4 | A6 | A8 | A10 | A12 |
|---|---|---|---|---|---|---|---|
| F6 | −1.1E+00 | 0.0E+00 | −2.5E−04 | 1.9E−06 | −7.7E−09 | 1.5E−11 | −1.1E−14 |
| F7 | −5.5E+00 | 0.0E+00 | 1.0E−04 | −2.0E−06 | 1.8E−08 | −7.1E−11 | 1.1E−13 |
| F8 | 1.9E−01 | 0.0E+00 | 2.0E−04 | −1.4E−06 | 3.0E−09 | 1.8E−12 | −1.1E−14 |
| F9 | −4.5E+20 | 0.0E+00 | 4.2E−04 | −4.5E−06 | 2.1E−08 | −1.0E−10 | 2.9E−13 |
| F10 | −1.1E−01 | 0.0E+00 | 6.6E−04 | −1.3E−05 | 1.0E−07 | −4.1E−10 | 6.6E−13 |

Referring to Table 3, it shows data associated with the focal distance of each lens in the first embodiment of the present disclosure.

TABLE 3

| a focal distance of each lens | a ratio of focal distance of each lens to total focal length of the optical system |
|---|---|
| f1 = 45 | f1/ft = 2.368 |
| f2 = 34 | f2/ft = 1.789 |
| f3 = 43 | f3/ft = 2.263 |
| f4 = 23 | f4/ft = 1.211 |
| f5 = 19 | f5/ft = 5.211 |
| ft = 19 |  |

Figure 2:
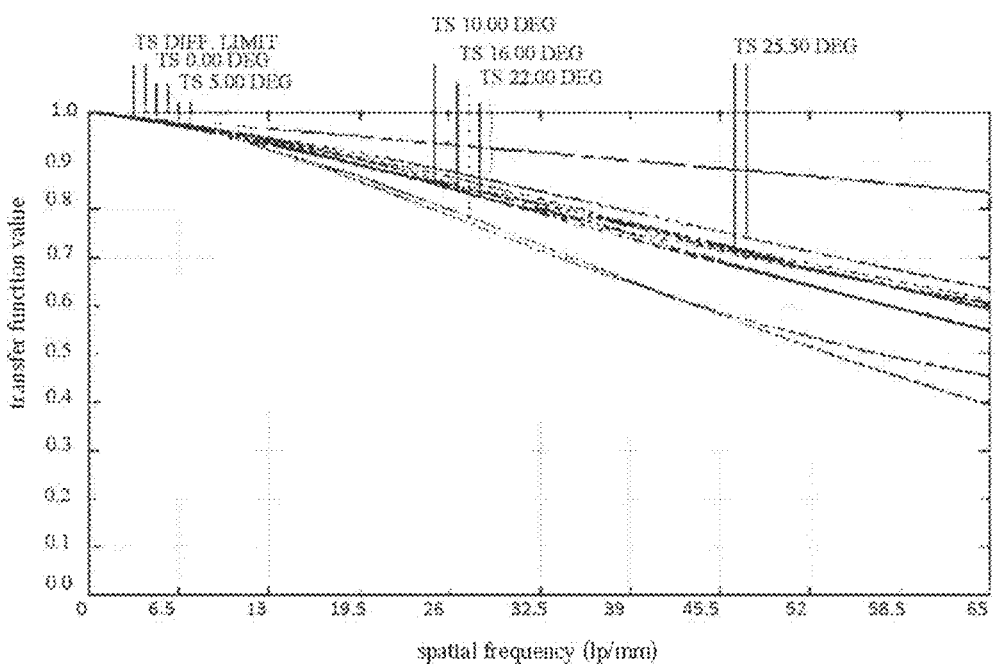
FIG. 2 is Modulation Transfer Function (MTF) graph of an optical system according to a first embodiment of the present disclosure.

With reference to FIG. 2, a diagram showing Modulation Transfer Function (MTF) is illustrated for the optical system according to the first embodiment of the present disclosure. The Modulation Transfer Function comprehensively reflects image quality of an optical system, with more smooth of a curve shape and higher of a Y-coordinate value (i.e., closer to 1) indicating better imaging quality of the optical system.

It can be seen from FIG. 2, where different image qualities under different image heights from 0.000 mm to 25.50 mm are depicted, the optical system has been corrected for aberration, characterized by smooth and compact MTF curves with high MTF values.

Figure 3:
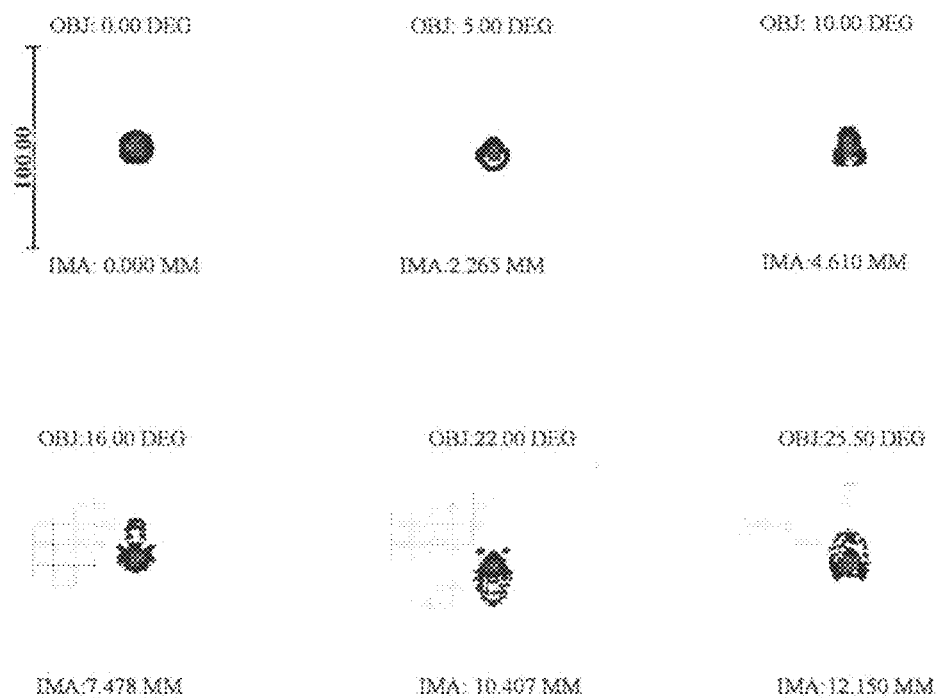
FIG. 3 is spot diagrams of an optical system according to a first embodiment of the present disclosure.

FIG. 3 shows spot diagrams of the optical system according to the first embodiment of the present disclosure. The spot diagram reflects geometric construction for an image formed in an optical system without consideration of diffraction. For an optical system with large aberration, spot distribution in the spot diagram approximately represents energy distribution of image points. Accordingly, density in a spot diagram can be used in evaluation of image quality, as it directly reflects or provides direct measurement on imaging quality of the optical system, with the smaller of a Root Mean Square (RMS) radius of the spot diagram indicating better imaging quality of the optical system. It can be seen from the spot diagrams in FIG. 3 that spots formed are small under each field-of-view of the present optical system, which demonstrates energy distribution of the optical system is well optimized and aberration of the optical system is efficiently corrected.

Figures 4A, 4B:
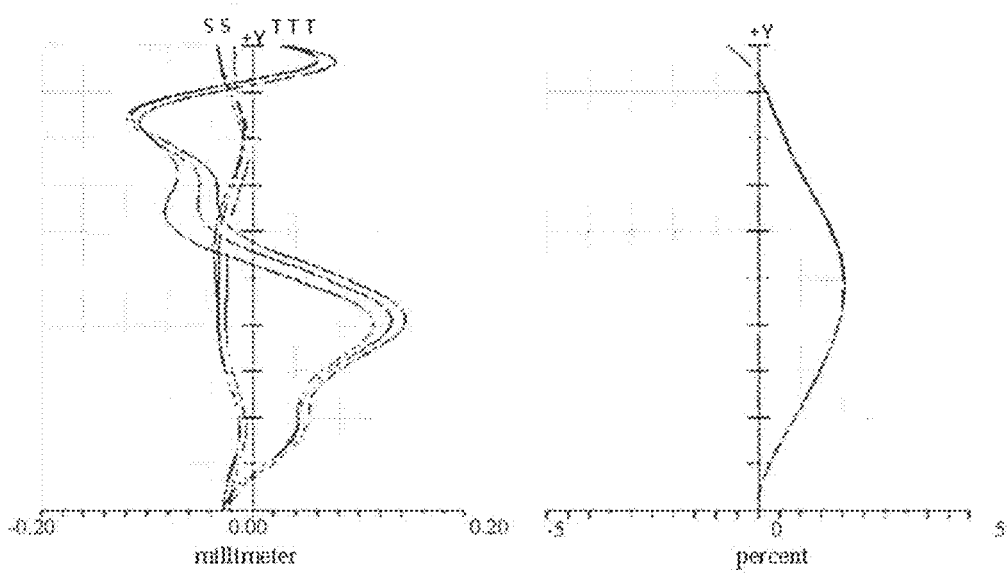
FIG. 4(a) is field curve graph of an optical system according to a first embodiment of the present disclosure.
FIG. 4(b) is a distortion curve graph of an optical system according to a first embodiment of the present disclosure.

FIGS. 4(a) and 4(b) are two diagrams respectively showing field curvature and aberration of the optical system according to the first embodiment of the present disclosure. The field curvature is an aberration where an image of a flat surface of an object is formed on a curved surface, which is characterized by meridianal curvature and sagittal curvature of field, referring to FIG. 4(a), with the T curve representing the meridianal curvature of field and S curve representing the sagittal curvature of field, as well as resultant difference there between representing astigmatism of the present optical system. The field curvature and the astigmatism both are important aberrations that affect off-axial field-of-view lights in the optical system, e.g., the field curvature and the astigmatism at too high values affect imaging quality for off-axis field-of-view lights badly in the optical system. It can be seen from FIGS. 4(a) and 4(b) that the field curvature and the astigmatism of the present optical system are both within a small range by correction.

Although not affecting clarity of an optical system, the aberration causes image deformation, which is extremely difficult to correct for a wide-angle lens and needs to be dealt with in image post-processing.

FIGS. 2 to 4 exhibit entirely characteristics of the optical system, such as wide field-of-view and high-image quality, in the first embodiment of the present disclosure.

Figure 5:
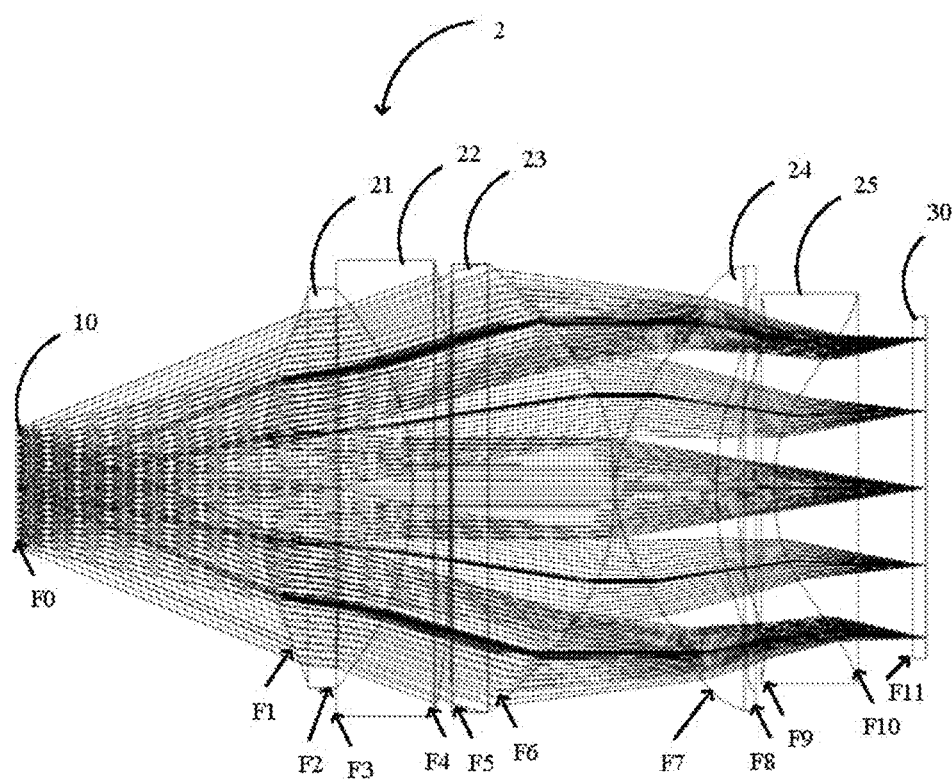
FIG. 5 is an optical path diagram of an optical system according to a second embodiment of the present disclosure.

With reference to FIG. 5, a schematic view is illustrated for an optical system 2 according to a second embodiment of the present disclosure. The optical system 2 includes a diaphragm 10, a first lens 21, a second lens 22, a third lens 23, a fourth lens 24, and a fifth lens 25 arranged in order from a human-eye observation side to an image side at the display unit 30 (i.e., from left to right). The first lens 21, the third lens 23 and the fourth lens 24 each are a positive lens, and the second lens 22 and the fifth lens 25 each are a negative lens.

From the left to right as shown in FIG. 5, a surface of the diaphragm 10 is numbered as F0, and similar numbering is given to individual surfaces of five lenses until a surface of the display unit 30 is numbered as F11. Specifically, the first lens 21 has a surface F1 facing and bulging toward the diaphragm 10 and a surface F2 facing toward the second lens 22. Curvature radius of the surface F1 is positive, while curvature radius of the surface F2 is negative. The second lens 22 has a surface F3 facing toward the first lens 21 and concaving toward the third lens 23 and a surface F4 facing and bulging toward the third lens 23. Curvature radiuses of the surface F3 and the surface F4 of the second lens 22 are negative. The third lens 23 has a surface F6 facing and bulging toward the fourth lens 24, with a negative curvature radius for F6. The fourth lens 24 has a surface F7 facing and bulging toward the third lens 23 and a surface F8 facing toward the fifth lens 25 and concaving toward the third lens 23. Curvature radiuses of the surface F7 and the surface F8 of the fourth lens 24 are positive. The fifth lens 25 has a surface F10 facing toward the display unit 30 and concaving toward the fourth lens 24 and a surface F9 facing and bulging toward the fourth lens 24. Curvature radiuses of the surface F9 and the surface F10 of the fifth lens 25 are positive.

In the second embodiment, the first lens 21, the second lens 22, the third lens 23, the fourth lens 24 and the fifth lens 25 each are aspheric, such that the optical system constituted by these five lenses is not only provided with well-corrected aberration and image distortion but also with lighter, thinner and flatter lens assembly.

In this embodiment, a focal distance of the first lens is f1, a focal distance of the second lens is f2, a focal distance of the third lens is f3, a focal distance of the fourth lens is f4, a focal distance of the fifth lens is f5, and a total focal distance of the optical system is ft, with the following formulas met:

$$1.5 < f1/ft < 3,$$

$$-2 < f2/ft < -1.2,$$

$$2 < f3/ft < 2.5,$$

$$0.5 < f4/ft < 1.5, \text{ and}$$

$$-6 < f5/ft < -1.$$

Specifically, referring to Table 4, it shows data associated with the optical system in the second embodiment of the present disclosure.

TABLE 4

Embodiment 2: exiting-hole diameter 7 mm, effective focal length 19 mm, field-of-view 2ω = 51°, distance of exit pupil 13~15 mm

| Surface | surface type | Radius(mm) | Thickness(mm) | nd | vd |
|---|---|---|---|---|---|
| F0 | | infinite | 13~15 | | |
| F1 | aspheric | 19 | 4.3 | 1.53 | 56 |
| F2 | aspheric | −304 | 3.9 | | |
| F3 | aspheric | −17 | 2 | 1.64 | 24 |
| F4 | aspheric | −281 | 0.1 | | |
| F5 | aspheric | infinite | 8.7 | 1.53 | 56 |
| F6 | aspheric | −25 | 0.1 | | |
| F7 | aspheric | 7 | 5.4 | 1.53 | 56 |
| F8 | aspheric | 24 | 1.2 | | |
| F9 | aspheric | 105 | 1.9 | 1.64 | 24 |
| F10 | aspheric | 17 | 8.1 | | |
| F11 | | infinite | | | |

Referring to Table 5, it shows data associated with the aspheric surfaces for lenses in the second embodiment of the present disclosure.

TABLE 5

| Sur | K | A2 | A4 | A6 | A8 | A10 | A12 | A14 | A16 |
|---|---|---|---|---|---|---|---|---|---|
| F1 | 9.1E−04 | 0.0E+00 | −1.2E−06 | −1.1E−06 | 1.8E−08 | −1.4E−10 | −4.2E−14 | 5.7E−15 | −2.2E−17 |
| F2 | 0.0E+00 | 0.0E+00 | 6.6E−35 | 8.1E−46 | 1.1E−46 | 1.5E−48 | 1.4E−50 | 1.3E−52 | 0.0E+00 |
| F3 | 0.0E+00 | 0.0E+00 | −1.4E−34 | 5.1E−45 | −5.4E−47 | −1.0E−48 | −1.1E−50 | −1.1E−52 | 0.0E+00 |
| F4 | −5.2E+04 | 0.0E+00 | −4.7E+00 | 5.6E−08 | 6.9E−10 | 2.6E−12 | −1.7E−14 | −3.9E−16 | 1.8E−18 |
| F5 | 0.0E+00 | 0.0E+00 | −9.9E−35 | −3.9E−46 | −4.0E−48 | −2.7E−50 | −1.4E−52 | −4.8E−55 | 0.0E+00 |
| F6 | −9.0E−01 | 0.0E+00 | −7.5E−04 | 1.1E−05 | −9.7E−08 | 4.7E−10 | −1.2E−12 | −1.2E−15 | 2.5E−19 |
| F7 | −3.9E+00 | 0.0E+00 | 5.5E−04 | −1.5E−05 | 1.9E−07 | −1.3E−09 | 4.3E−12 | −7.6E−15 | 1.7E−17 |
| F8 | −4.3E+00 | 0.0E+00 | 5.3E−04 | −1.1E−05 | 2.3E−08 | 1.1E−09 | −1.1E−11 | 2.8E−14 | 4.5E−17 |
| F9 | −4.5E+20 | 0.0E+00 | 1.1E−03 | −1.8E−05 | 9.1E−08 | 5.2E−10 | −7.8E−12 | 9.3E−15 | 1.2E−16 |
| F10 | −1.3E+00 | 0.0E+00 | 2.1E−03 | −7.1E−05 | 1.3E−06 | −1.4E−08 | 7.5E−11 | −1.7E−13 | 0.0E+00 |

Referring to Table 6, it shows data associated with the focal distance of each lens in the second embodiment of the present disclosure.

TABLE 6

| a focal distance of each lens | a ratio of focal distance of each lens to total focal length of the optical system |
|---|---|
| f1 = 34 | f1/ft = 1.789 |
| f2 = −27 | f2/ft = 1.421 |
| f3 = 46 | f3/ft = 2.421 |
| f4 = 17 | f4/ft = 0.895 |
| f5 = 32 | f5/ft = 1.684 |
| ft = 19 | |

Figure 6:
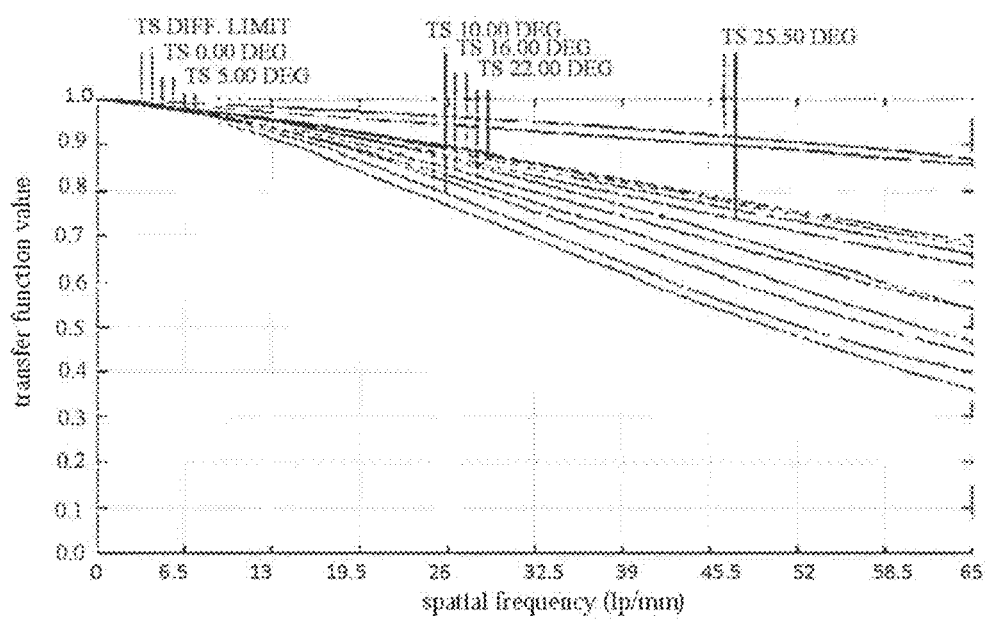
FIG. 6 is Modulation Transfer Function (MTF) graph of an optical system according to a second embodiment of the present disclosure.

With reference to FIG. 6, a diagram showing Modulation Transfer Function (MTF) is illustrated for the optical system according to the second embodiment of the present disclosure. It can be seen from FIG. 6, where different image qualities under different image heights from 0.000 mm to 25.50 mm are depicted, the optical system has been corrected for aberration, characterized by smooth and compact MTF curves with high MTF values.

FIG. 7 shows spot diagrams of the optical system according to the second embodiment of the present disclosure. It can be seen from the spot diagrams that spots formed under light in each field-of-view all have small and uniform radiuses at a plat surface of an image (i.e., a display device I, corresponding to the display unit 30), and spots formed under lights with different wavelengths in one field-of-view are in low degree of dislocation, demonstrating efficiently corrected aberration for the optical system and an overall uniform display image with high optical property that observed from an eye lens of the optical system.

FIGS. 8(a) and 8(b) are two diagrams respectively showing field curvature and aberration of the optical system according to the second embodiment of the present disclosure. It can be seen from FIGS. 8(a) and 8(b) that the optical system in the second embodiment is provided with well-controlled field curvature, astigmatism and distortion, thus achieving wide field-of-view and high imaging quality.

FIGS. 6 to 8 exhibit comprehensive characteristics of the optical system, such as wide field-of-view and high-image quality, in the second embodiment of the present disclosure.

Figure 9:
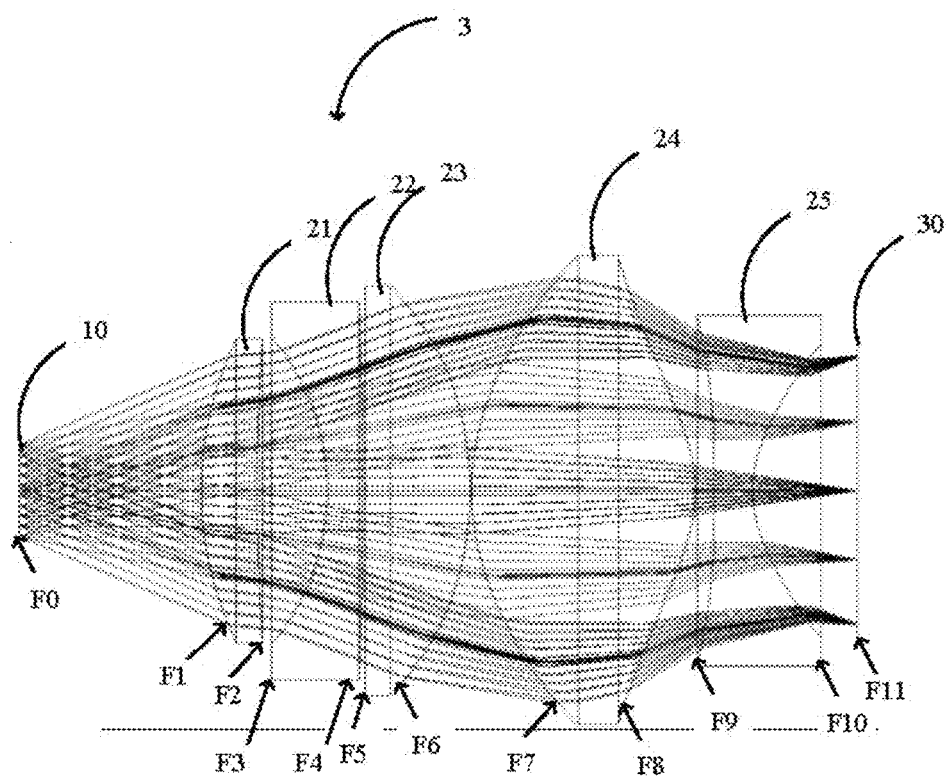
FIG. 9 is an optical path diagram of an optical system according to a third embodiment of the present disclosure.

With reference to FIG. 9, a schematic view is illustrated for an optical system 3 according to a third embodiment of the present disclosure. The optical system 3 includes a diaphragm 10, a first lens 21, a second lens 22, a third lens 23, a fourth lens 24, and a fifth lens 25 arranged in order from a human-eye observation side to an image side at the display unit 30 (i.e., from left to right), The first lens 21, the third lens 23 and the fourth lens 24 each are a positive lens, and the second lens 22 and the fifth lens 25 each are a negative lens.

From the left to right as shown in FIG. 9, a surface of the diaphragm 10 is numbered as F0, and similar numbering is given to individual surfaces of five lenses until a surface of the display unit 30 is numbered as F11. Specifically, the first lens 21 has a surface F1 facing and bulging toward the diaphragm 10 and a surface F2 facing toward the second lens 22 and concaving towards the diaphragm 10. Curvature radiuses of the surface F1 and the surface F2 of the first lens 21 are positive. The second lens 22 has a surface F3 facing toward the first lens 21 and concaving toward the third lens 23 and a surface F4 facing toward the third lens 23. Curvature radiuses of the surface F3 and the surface F4 of the second lens 22 are negative. The third lens 23 has a surface F6 facing and bulging toward the fourth lens 24, with a negative curvature radius for the surface F6. The fourth lens 24 has a surface F7 facing and bulging toward the third lens 23, and a surface F8 facing toward the fifth lens 25 and bulging toward the fifth lens 25. Curvature radius of the surface F7 is positive, while curvature radius of the surface F8 is negative. The fifth lens 25 has a surface F9 facing toward the fourth lens 24 and concaving toward the display unit 30, and a surface F10 facing toward the display unit 30 and concaving toward the fourth lens 24. Curvature radiuses of the surface F9 and the surface F10 of the fifth lens 25 are negative.

The first lens 21 and the second lens 22 each are spherical. The surface of the third lens 23 facing toward the second lens 22 is spherical, while the surface of the third lens 23 facing toward the fourth lens 24 is aspheric. The fourth lens 24 and the fifth lens 25 each are aspheric.

In this embodiment, a focal distance of the first lens is f1, a focal distance of the second lens is f2, a focal distance of the third lens is f3, a focal distance of the fourth lens is f4, a focal distance of the fifth lens is f5, and a total focal distance of the optical system is ft, with the following formulas met:

$$1.5 < f1/ft < 3,$$

$$-2 < f2/ft < -1.2,$$

$$2 < f3/ft < 2.5,$$

$$0.5 < f4/ft < 1.5, \text{ and}$$

$$-6 < f5/ft < -1.$$

Specifically, referring to Table 7, it shows data associated with the optical system in the third embodiment of the present disclosure.

TABLE 7

Embodiment 3: exiting-hole diameter 7 mm, effectivefocallength 19 mm, field-of-view 2ω = 51°, distance of exit pupil 13~15 mm

| Surface | surface type | Radius(mm) | Thickness(mm) | Material nd | vd |
|---|---|---|---|---|---|
| F0 |  | infinite | 13~15 |  |  |
| F1 | spheric | 24 | 4 | 1.53 | 56 |
| F2 | spheric | 160 | 5 |  |  |
| F3 | spheric | −17 | 2.5 | 1.64 | 24 |
| F4 | spheric | −400 | 0.2 |  |  |
| F5 | spheric | infinite | 7.5 | 1.53 | 56 |
| F6 | aspheric | −24 | 0.1 |  |  |
| F7 | aspheric | 17 | 16 | 1.53 | 56 |
| F8 | aspheric | −9.6 | 1.3 |  |  |
| F9 | aspheric | 30 | 2.8 | 1.59 | 30 |
| F10 | aspheric | 8 | 7.5 |  |  |
| F11 |  | infinite |  |  |  |

Referring to Table 8, it shows data associated with the aspheric surfaces of the lenses in the third embodiment of the present disclosure.

TABLE 8

| Surface | K | A2 | A4 | A6 | A8 | A10 | A12 |
|---|---|---|---|---|---|---|---|
| F6 | 9.0E−01 | 0.0E+00 | 0.0E+00 | −1.1E−07 | 5.5E−10 | 0.0E+00 | 0.0E+00 |
| F7 | −3.5E+00 | 0.0E+00 | 3.8E−05 | −1.2E−07 | 4.3E−10 | −9.5E−13 | 1.4E−15 |
| F8 | −4.0E+00 | 0.0E+00 | 3.4E−05 | −9.1E−08 | 1.2E−10 | 0.0E+00 | 0.0E+00 |
| F9 | −1.3E+38 | 0.0E+00 | −1.5E−04 | 1.1E−06 | −2.9E−09 | 0.0E+00 | 0.0E+00 |
| F10 | −9.7E−01 | 0.0E+00 | −3.0E−04 | 1.3E−06 | −7.7E−11 | 0.0E+00 | 0.0E+00 |

Referring to Table 9, it shows data associated with the focal distance of each lens in the third embodiment of the present disclosure.

TABLE 9

| a focal distance of each lens | a ratio of focal distance of each lens to total focal length of the optical system |
|---|---|
| f1 = 53 | f1/ft = 2.789 |
| f2 = −28 | f2/ft = −1.474 |
| f3 = 5 | f3/ft = 2.368 |
| f4 = 15 | f4/ft = 0.789 |
| f5 = −20 | f5/ft = −1.053 |
| ft = 19 |  |

Figure 10:
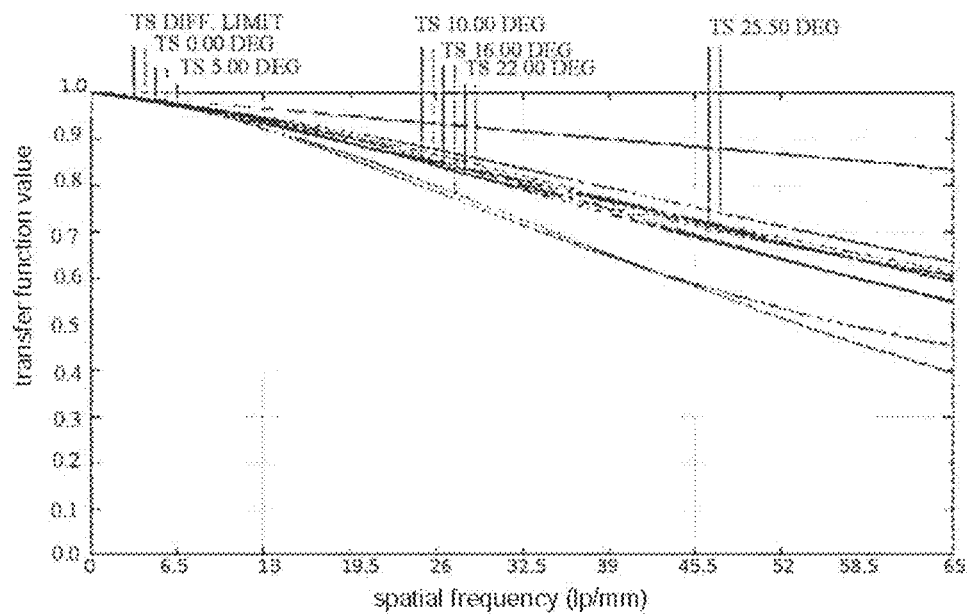
FIG. 10 is Modulation Transfer Function (MTF) graph of an optical system according to a third embodiment of the present disclosure.

With reference to FIG. 10, a diagram showing Modulation Transfer Function (MTF) is illustrated for the optical system according to the third embodiment of the present disclosure. It can be seen from FIG. 10, where different image qualities under different image heights from 0.000 mm to 25.50 mm are depicted, the optical system has been corrected for aberration, characterized by smooth and compact MTF curves with high MTF values.

Figure 11:
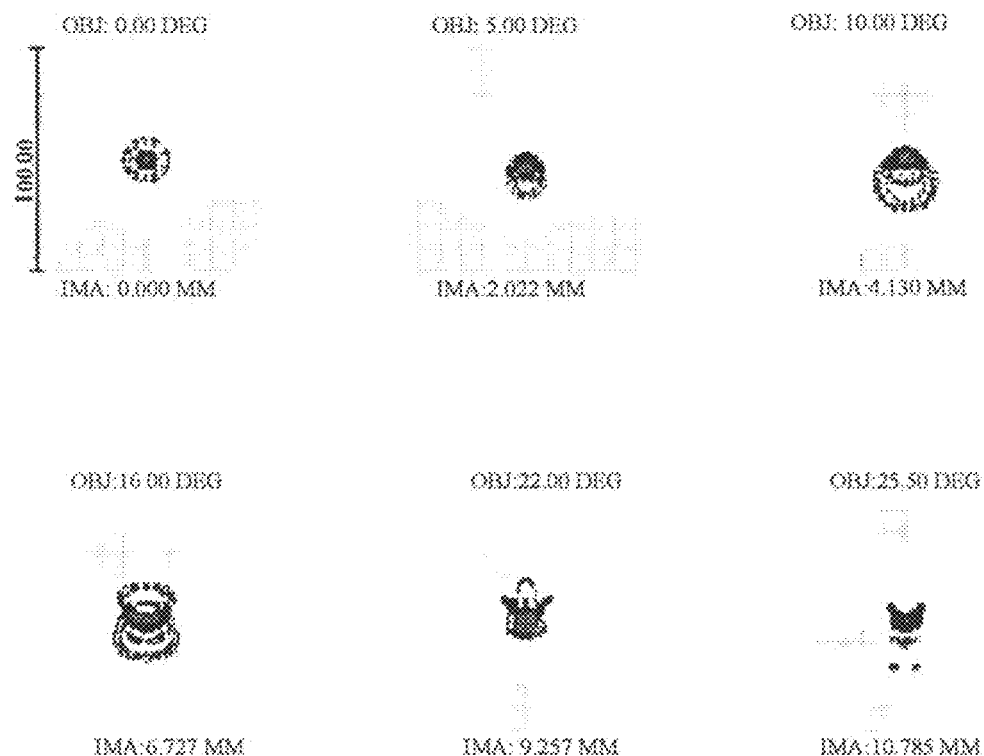
FIG. 11 is spot diagrams of an optical system according to a third embodiment of the present disclosure.

FIG. 11 shows spot diagrams of the optical system according to the second embodiment of the present disclosure. It can be seen from the spot diagrams that spots formed under light in each field-of-view all have small and uniform radiuses at a plat surface of an image (i.e., a display device I, corresponding to the display unit 30), and spots formed under lights with different wavelengths in one field-of-view are in low degree of dislocation, demonstrating efficiently corrected aberration for the optical system and an overall uniform display image with high optical property that observed from an eye lens of the optical system.

Figures 12A, 12B:
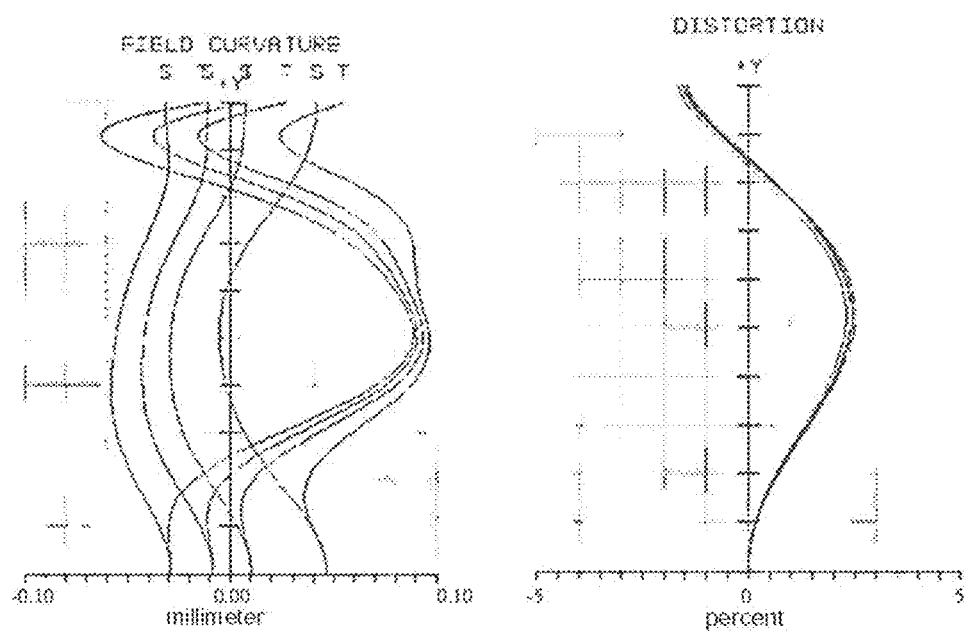
FIG. 12(a) is field curve graph of an optical system according to a third embodiment of the present disclosure.
FIG. 12(b) is a distortion curve graph of an optical system according to a third embodiment of the present disclosure.

FIGS. 12($a$) and 12($b$) are two diagrams respectively showing field curvature and aberration of the optical system according to the third embodiment of the present disclosure. It can be seen from FIGS. 12($a$) and 12($b$) that the optical system in the third embodiment is provided with well-controlled field curvature, astigmatism and distortion, thus achieving wide field-of-view and high imaging quality.

FIGS. 9 to 12 exhibit comprehensive characteristics of the optical system, such as wide field-of-view and high-image quality, in the third embodiment of the present disclosure.

The foregoing descriptions are merely preferred embodiments of the present disclosure and are not intended to limit the present disclosure. Any modifications, equivalent replacements and alternatives made within the spirit and principle of the present disclosure will be included in the protection of the present disclosure.

What is claimed is:

1. An optical system; comprising:
a first lens, a second lens, a third lens, a fourth lens and a fifth lens in order arranged coaxially along an optical axis direction from a human-eye observation side to an image side at a display unit, wherein:
the first lens is a positive lens with a focal distance f1,
the second lens is a negative lens with a focal distance f2,
the third lens is a positive lens with a focal distance f3,
the fourth lens is a positive lens with a focal distance f4,
the fifth lens is a negative lens with a focal distance f5, and
the optical system is of a total focal distance ft, with the following formulas met:

$1.5 < f1/ft < 3$, $-2 < f2/ft < -1.2$, $2 < f3/ft < 2.5$, $0.5 < f4/ft < 1.5$, and $-6 < f5/ft < -1$.

2. The optical system according to claim 1, wherein the fourth lens and the fifth lens each have two aspheric surfaces, and the third lens has an aspheric surface facing toward the fourth lens.

3. The optical system according to claim 2, wherein the first lens and the second lens each have two spherical surfaces, and the third lens has a spherical surface facing toward the second lens.

4. The optical system according to claim 2, wherein the first lens and the second lens each have two aspheric surfaces, and the third lens has an aspheric surface facing toward the second lens.

5. The optical system according to claim 1, wherein the fourth lens has a surface facing and bulging toward the third lens.

6. The optical system according to claim 5, wherein the fourth lens has a surface facing and bulging toward the fifth lens.

7. The optical system according to claim 6, wherein the first lens has a surface facing toward a diaphragm and bulging toward the human-eye observation side.

8. The optical system according to claim 7, wherein the second lens has a surface facing toward the first lens and concaving toward the third lens.

9. The optical system according to claim 8, wherein the third lens has a surface facing and bulging toward the fourth lens.

10. A head-mounted display apparatus, comprising a display unit and an optical system, wherein the optical system is disposed between human eyes and the display unit.

11. The head-mounted display apparatus according to claim 10, comprising a first lens, a second lens, a third lens, a fourth lens and a fifth lens in order arranged coaxially along an optical axis direction from a human-eye observation side to an image side at a display unit, wherein
the first lens is a positive lens with a focal distance f1,
the second lens is a negative lens with a focal distance f2,
the third lens is a positive lens with a focal distance f3,
the fourth lens is a positive lens with a focal distance f4,
the fifth lens is a negative lens with a focal distance f5, and
the optical system is of a total focal distance ft, with the following formulas met:

$1.5 < f1/ft < 3$, $-2 < f2/ft < -1.2$, $2 < f3/ft < 2.5$, $0.5 < f4/ft < 1.5$, and $-6 < f5/ft < -1$.

12. The head-mounted display apparatus according to claim 10, wherein the fourth lens and the fifth lens each have two aspheric surfaces, and the third lens has an aspheric surface facing toward the fourth lens.

13. The head-mounted display apparatus according to claim 12, wherein the first lens and the second lens each have two spherical surfaces, and the third lens has a spherical surface facing toward the second lens.

14. The head-mounted display apparatus according to claim 12, wherein the first lens and the second lens each have two aspheric surfaces, and the third lens has an aspheric surface facing toward the second lens.

15. The head-mounted display apparatus according to claim 10, wherein the fourth lens has a surface facing and bulging toward the third lens.

16. The head-mounted display apparatus according to claim 15, wherein the fourth lens has a surface facing and bulging toward the fifth lens.

17. The head-mounted display apparatus according to claim 16, wherein the first lens has a surface facing toward a diaphragm and bulging toward the human-eye observation side.

18. The head-mounted display apparatus according to claim 17, wherein the second lens has a surface facing toward the first lens and concaving toward the third lens.

19. The head-mounted display apparatus according to claim 18, wherein the third lens has a surface facing and bulging toward the fourth lens.

* * * * *